(12) United States Patent
Suzuki et al.

(10) Patent No.: US 11,323,032 B2
(45) Date of Patent: May 3, 2022

(54) PLURAL POWER MODULES CONVERSION DEVICE WITH SWITCH ELEMENT CONTROL

(71) Applicant: SHINDENGEN ELECTRIC MANUFACTURING CO., LTD., Tokyo (JP)

(72) Inventors: Kenichi Suzuki, Saitama (JP); Wataru Miyazawa, Saitama (JP)

(73) Assignee: SHINDENGEN ELECTRIC MANUFACTURING CO., LTD., Tokyo (JP)

( * ) Notice: Subject to any disclaimer, the term of this patent is extended or adjusted under 35 U.S.C. 154(b) by 43 days.

(21) Appl. No.: 16/957,722

(22) PCT Filed: Dec. 28, 2017

(86) PCT No.: PCT/JP2017/047170
§ 371 (c)(1),
(2) Date: Jun. 25, 2020

(87) PCT Pub. No.: WO2019/130533
PCT Pub. Date: Jul. 4, 2019

(65) Prior Publication Data
US 2020/0373826 A1    Nov. 26, 2020

(51) Int. Cl.
*H02M 3/158*    (2006.01)
*H02M 1/32*    (2007.01)
(Continued)

(52) U.S. Cl.
CPC ......... *H02M 3/1584* (2013.01); *H02M 1/088* (2013.01); *H02M 1/327* (2021.05); *H02M 1/08* (2013.01)

(58) Field of Classification Search
CPC ...... H02M 1/08; H02M 1/088; H02M 3/1584; H02M 1/327; H02M 1/0054
See application file for complete search history.

(56) References Cited

U.S. PATENT DOCUMENTS

| 2002/0044458 A1* | 4/2002 | Elbanhawy | H02J 1/102 363/15 |
| 2010/0071742 A1* | 3/2010 | de Rooij | H02M 7/53873 136/244 |

(Continued)

FOREIGN PATENT DOCUMENTS

| JP | 2017225227 A | 12/2017 |
| WO | 2012153459 A1 | 11/2012 |

(Continued)

OTHER PUBLICATIONS

International Search Report in PCT/JP2017/047170, dated Mar. 13, 2018. 4pp.

*Primary Examiner* — Alex Torres-Rivera
(74) *Attorney, Agent, or Firm* — Hauptman Ham, LLP

(57) ABSTRACT

A power conversion device according to the present invention is provided with two or more sets of power modules each of which includes a switching element and a switching element control circuit having a third electrode voltage control part and a temperature detection part. The power modules PM1, PM2 are connected in parallel to each other. The switching element control circuit includes a temperature comparison part which calculates an average operation temperature of the switching element, and compares an operation temperature of the corresponding switching element and the average operation temperature. The third electrode voltage control part controls a third electrode voltage based on information including an average operation temperature, an operation temperature of the switching element, and a threshold voltage during operation.

15 Claims, 12 Drawing Sheets

(51) Int. Cl.
*H02M 1/088* (2006.01)
*H02M 1/08* (2006.01)

(56) References Cited

U.S. PATENT DOCUMENTS

| | | | |
|---|---|---|---|
| 2010/0164454 A1* | 7/2010 | Rinne | H02M 3/1584 323/282 |
| 2012/0217795 A1* | 8/2012 | Hasegawa | B60L 3/003 307/9.1 |
| 2013/0147525 A1 | 6/2013 | Takagiwa | |
| 2016/0003754 A1* | 1/2016 | Ishikawa | H02M 7/53871 702/136 |
| 2018/0013345 A1 | 1/2018 | Kakuno | |

FOREIGN PATENT DOCUMENTS

| | | |
|---|---|---|
| WO | 2016125712 A1 | 8/2016 |
| WO | 2017073150 A1 | 5/2017 |

\* cited by examiner

PLURAL POWER MODULES CONVERSION DEVICE WITH SWITCH ELEMENT CONTROL

RELATED APPLICATIONS

The present application is a National Phase of International Application number PCT/JP2017/047170, filed Dec. 28, 2017.

TECHNICAL FIELD

The present invention relates to a power conversion device.

BACKGROUND ART

Conventionally, there has been known a power module which controls an ON/OFF operation of a switching element (see patent document 1, for example).

As shown in FIG. 12, a conventional power module 900 includes: a switching element 800 having a first electrode, a second electrode, and a gate electrode; and a gate voltage control part 910 which controls a gate voltage so as to control an ON/OFF operation of the switching element 800.

According to the conventional power module 900, an ON/OFF operation of the switching element 800 can be controlled by controlling a gate voltage using the gate voltage control part 910.

PRIOR ART DOCUMENT

Patent Document

Patent document 1: WO/2012/153459

SUMMARY OF INVENTION

Problem to be Solved by the Invention

Recently, there has been a demand for a power module which can reduce a switching loss. As a method for realizing such a power module, a method is considered where a switching loss is reduced by shortening a turn-on period and a turn-off period by applying a gate voltage which slightly exceeds a threshold voltage to a gate electrode.

However, a threshold voltage Vth during operation changes from an initial threshold voltage $Vth_0$ due to a fact that an operation temperature T of the switching element during operation becomes higher than an initial temperature $T_0$ of the switching element when an initial threshold voltage (a threshold voltage at the time of shipping) is measured (see FIG. 3). Accordingly, it is difficult to shorten a turn-on period and a turn-off period by applying a voltage which slightly exceeds the threshold voltage Vth during the operation to a gate electrode thus giving rise to a drawback that it is difficult to reduce a switching loss.

Further, in general, in a case where a power conversion device is operated in a state where a plurality of power modules are connected in parallel to each other, a current which flows in switching elements of the respective power modules is distributed by making use of temperature characteristics of ON resistors Ron. However, when irregularities occur in an operation temperature of the switching element, irregularities occur also in a balance of currents distributed to the respective switching elements and hence, a specified switching element (a switching element of a high temperature) is deteriorated earlier and hence, there also exists a drawback that a lifetime of the device is shortened.

The present invention has been made to overcome the above-mentioned drawbacks, it is an object of the present invention to provide a power conversion device which can reduce a switching loss of a switching element, and can prolong a lifetime of the device even when the power conversion device is operated in a state where a plurality of power modules are connected in parallel to each other.

Solution to Problem

[1] A power conversion device according to an aspect of the present invention includes: two or more sets of power modules each of which includes: a switching element having a first electrode, a second electrode, and a third electrode; a third electrode voltage control part which controls a third electrode voltage for controlling an ON/OFF operation of the switching element; and a switching element control circuit which has a temperature detection part detecting an operation temperature of the switching element, and the power modules are connected in parallel to each other, each of the switching element control circuits further includes a temperature comparison part which calculates an average operation temperature of all of the switching elements in the power conversion device, and compares an operation temperature of the corresponding switching element with the average operation temperature, and the third electrode voltage control part controls the third electrode voltage based on information including the average operation temperature, an operation temperature of the switching element detected by the temperature detection part, and a threshold voltage during operation calculated based on the operation temperature.

[2] In the power conversion device according to the present invention, it is preferable that the temperature comparison part transmit a signal which increases the third electrode voltage to the third electrode voltage control part when an operation temperature of the switching element is lower than the average operation temperature, and transmit a signal which decreases the third electrode voltage to the third electrode voltage control part when the operation temperature of the switching element is higher than the average operation temperature.

[3] In the power conversion device according to the present invention, it is preferable that the temperature comparison part transmit a signal which increases the third electrode voltage to the third electrode voltage control part by an increment which corresponds to a temperature difference between an operation temperature of the switching element and the average operation temperature when the operation temperature of the switching element is lower than the average operation temperature, and transmit a signal which decreases the third electrode voltage to the third electrode voltage control part by a decrement corresponding to a temperature difference between an operation temperature of the switching element and the average operation temperature when the operation temperature of the switching element is higher than the average operation temperature.

[4] In the power conversion device according to the present invention, it is preferable that in the temperature detection part, a thermistor be used as a temperature detection element.

[5] In the power conversion device according to the present invention, it is preferable that each of the switching element control circuits include: a memory part which stores information including an initial threshold voltage of the switching element and an initial temperature of the switching element when the initial threshold voltage is measured and information relating to a temperature characteristic of a threshold voltage of the switching element; and a threshold voltage calculation part which calculates a threshold voltage during operation of the switching element based on information including the operation temperature of the switching element which is detected by the temperature detection part, an initial threshold voltage of the switching element, and an initial temperature of the switching element when the initial threshold voltage is measured, and information relating to a temperature characteristic of a threshold voltage of the switching element, wherein the third electrode voltage control part control the third electrode voltage based on information including the threshold voltage during the operation which is calculated by the threshold voltage calculation part as the threshold voltage during the operation calculated based on the operation temperature.

[6] In the power conversion device according to the present invention, it is preferable that assuming a temperature coefficient of a threshold voltage of the switching element as $\alpha$, a threshold voltage during the operation of the switching element as Vth, the initial threshold voltage as $Vth_0$, the operation temperature of the switching element detected by the temperature detection part as T, and an initial temperature of the switching element when the initial threshold voltage is measured as $T_0$, information relating to the temperature characteristic of the threshold voltage of the switching element be a characteristic equation which satisfies the relationship of $Vth=Vth_0-\alpha(T-T_0)$.

[7] In the power conversion device according to the present invention, it is preferable that each of the switching element control circuits be a switching element control circuit which performs an initial threshold voltage measurement mode where the initial threshold voltage of the corresponding switching element is measured, and a control mode where an ON/OFF operation of the corresponding switching element is controlled, wherein each of the switching element control circuits further include: a threshold voltage measurement power source which supplies a threshold voltage measurement current to the first electrode of the switching element; a first electrode current detection part which detects a first electrode current flowing through the switching element; and an ON/OFF state determination part which determines an ON/OFF state of the switching element, and in the initial threshold voltage measurement mode, the third electrode voltage control part control the third electrode voltage such that the third electrode voltage is increased in a stepwise manner, the ON/OFF state determination part determine whether or not the switching element is turned on base on the first electrode current which is detected by the first electrode current detection part, and the memory part, when the ON/OFF state determination part determines that the switching element is brought into an ON state, store the temperature of the switching element, and store the third electrode voltage applied to the third electrode as the initial threshold voltage of the switching element.

[8] In the power conversion device according to the present invention, it is preferable that each of the switching element control circuits be a switching element control circuit which further performs a temperature characteristic measurement mode where a temperature characteristic of a threshold voltage of the switching element is measured after the control mode is performed for a predetermined time, each of the switching element control circuits further include a temperature characteristic calculation part which calculates a temperature characteristic of a threshold voltage of the switching element, wherein in the temperature characteristic measurement mode, the third electrode voltage control part control the third electrode voltage such that the third electrode voltage is increased in a stepwise manner, the ON/OFF state determination part determine whether or not the switching element is turned on based on the switching current which is detected by the switching current detection part, the memory part, when the ON/OFF state determination part determines that the switching element is brought into an ON state, store the operation temperature of the switching element, and store the third electrode voltage applied to the third electrode as a temperature characteristic measurement time threshold voltage of the switching element, and the temperature characteristic calculation part calculate a temperature characteristic of a threshold voltage of the switching element based on information including the initial threshold voltage, an initial temperature of the switching element when the initial threshold voltage is measured, the operation temperature of the switching element detected by the temperature detection part in the temperature characteristic measurement mode, and the temperature characteristic measurement time threshold voltage.

[9] In the power conversion device according to the present invention, it is preferable that each of the switching element control circuits be a switching element control circuit which performs a temperature characteristic measurement mode where a temperature characteristic of a threshold voltage in the corresponding switching element is measured after the control mode is performed for a predetermined time, each of the switching element control circuits further include: a threshold voltage measurement power source which supplies a threshold voltage measurement current to the first electrode of the switching element; a switching current detection part which detects a switching current flowing through the switching element; an ON/OFF state determination part which determines an ON/OFF state of the switching element; and a temperature characteristic calculation part which calculates a temperature characteristic of a threshold voltage of the switching element, wherein in the temperature characteristic measurement mode, the third electrode voltage control part control the third electrode voltage such that the third electrode voltage is increased in a stepwise manner, the ON/OFF state determination part determine whether or not the switching element is turned on based on the switching current which is detected by the switching current detection part, the memory part, when the ON/OFF state determination part determines that the switching element is brought into an ON state, store the third electrode voltage applied to the third electrode as a temperature characteristic measurement time threshold voltage of the switching element, and the temperature characteristic calculation part calculate a temperature characteristic of a threshold voltage of the switching element based on information including the initial threshold voltage, an initial temperature of the switching element when the initial threshold voltage is measured, the operation temperature of the switching element detected by the temperature detection part in the temperature characteristic measurement mode, and the temperature characteristic measurement time threshold voltage.

[10] In the power conversion device according to the present invention, it is preferable that the switching element be a MOSFET, an IGBT, or a HEMI.

[11] In the power conversion device according to the present invention, it is preferable that the switching element be formed using a material which contains GaN, SiC, or $Ga_2O_3$.

[12] A power conversion device according to another aspect of the present invention includes: two or more sets of power modules each of which includes: a switching element having a first electrode, a second electrode, and a third electrode; a third electrode voltage control part which controls a third electrode voltage for controlling an ON/OFF operation of the switching element; and a switching element control circuit which has a temperature detection part detecting an operation temperature of the switching element, wherein the power modules are connected in parallel to each other, the power conversion device further includes a temperature comparison part which calculates an average operation temperature of all of the switching elements in the power conversion device, and compares an operation temperature of the corresponding switching element with the average operation temperature, and the third electrode voltage control part controls the third electrode voltage based on information including the average operation temperature, an operation temperature of the switching element detected by the temperature detection part, and a threshold voltage during operation calculated based on the operation temperature.

Advantageous Effects of Invention

In the power conversion device according to the present invention, the third electrode voltage control part of each switching element control circuit controls the third electrode voltage based on information including an operation temperature of the switching element detected by the temperature detection part, and a threshold voltage during operation calculated based on the operation temperature. Accordingly, even when the threshold voltage during the operation changes from an initial threshold voltage due to a fact that the operation temperature of the switching element during the operation becomes higher than the initial temperature of the switching element when an initial threshold voltage is measured, it is possible to apply a voltage which slightly exceeds the threshold voltage during the operation to the gate electrode. As a result, compared to a case where the third electrode voltage is controlled using a designed threshold voltage, a turn-on period and a turn-off period can be shortened and hence, a switching loss of the switching element can be reduced.

Further, in the power conversion device according to the present invention, the third electrode voltage control part controls the third electrode voltage based on information including the average operation temperature, an operation temperature of the switching element detected by the temperature detection part, and a threshold voltage calculated based on the operation temperature. Accordingly, even when irregularities occur in an operation temperature of each switching element, the third electrode voltage can be controlled based on a temperature difference between the average operation temperature and an operation temperature of the corresponding switching element and hence, irregularities minimally occurs in a balance of currents distributed to the respective switching elements. Accordingly, it is possible to prevent rapid deterioration of the switching element of a high temperature. As a result, even when the power conversion device is operated in a state where a plurality of power modules are connected in parallel to each other, the lifetime of the power conversion device can be prolonged.

BRIEF DESCRIPTION OF DRAWINGS

FIG. 4A is the schematic view of the graph indicating a change with time of the gate-source voltage Vgs when the gate voltage is applied to the gate electrode in a power module according to a comparison example, and FIG. 4B is the schematic view of the graph indicating the change with time of the gate-source voltage Vgs when the gate voltage which slightly exceeds the threshold voltage is applied to the gate electrode in the power conversion device 1 according to the embodiment 1.

DESCRIPTION OF EMBODIMENTS

Hereinafter, a power conversion device according to the present invention is described based on embodiments shown in drawings. The respective drawings are schematic views, and do not always strictly reflect the actual circuit configuration and actual graphs.

Embodiment 1

1. Configuration of Power Conversion Device 1 According to Embodiment 1

Figure 1:
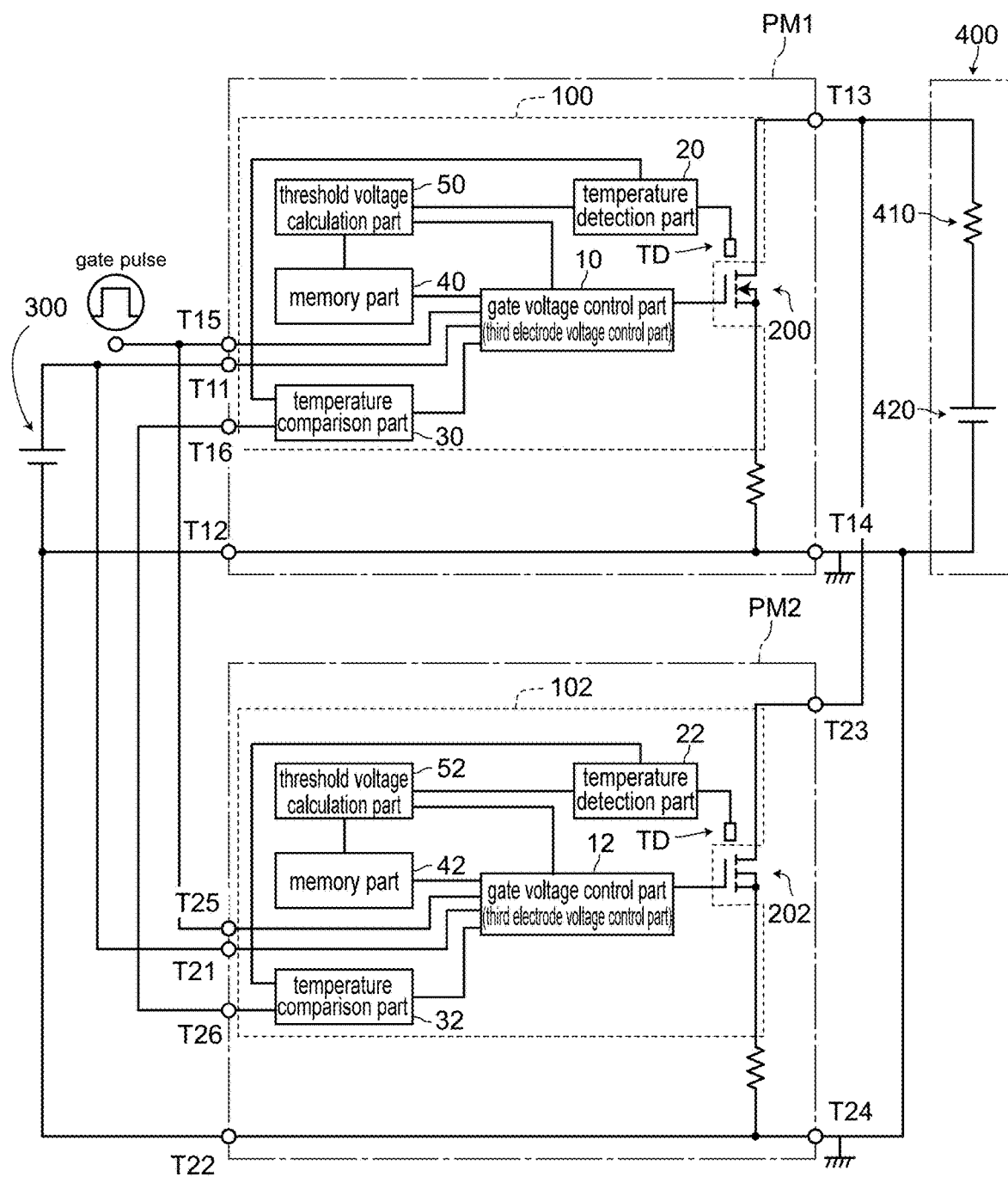
FIG. 1 is a circuit diagram of a power conversion device 1 according to an embodiment 1.
Figure 2:
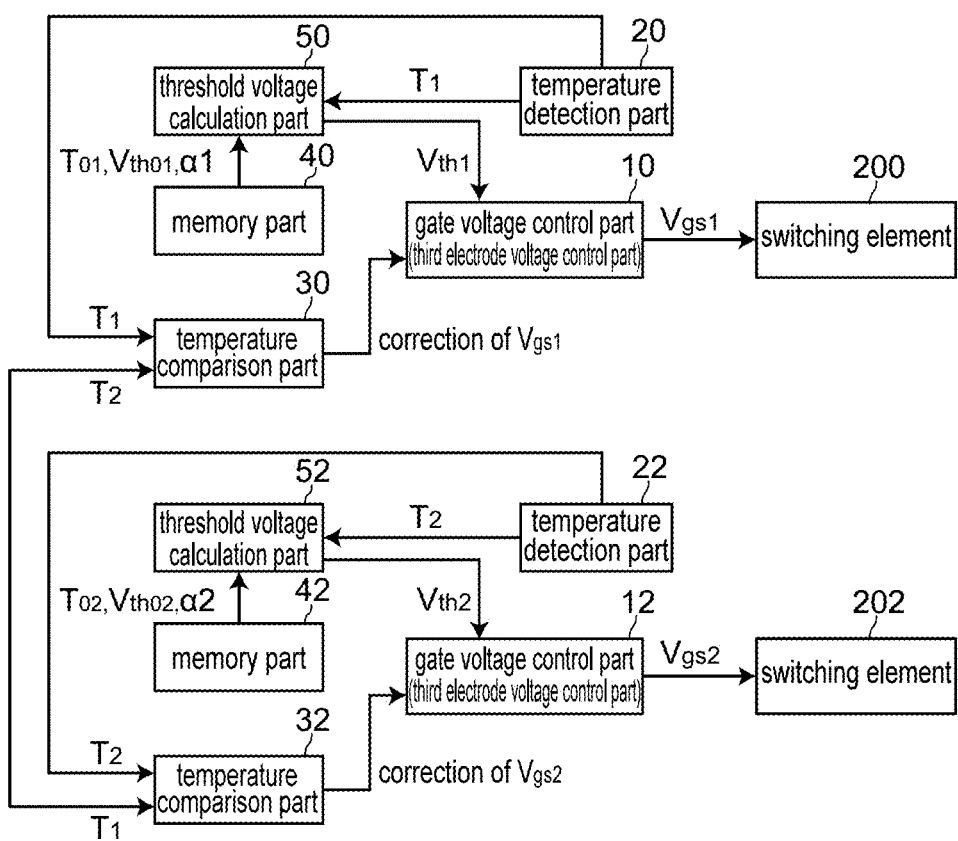
FIG. 2 is a block diagram of a control mode according to the embodiment 1.

As shown in FIG. 1, a power conversion device 1 according to the embodiment 1 includes: two sets of power modules (a power module PM1 which includes a switching element 200 and a switching element control circuit 100, and a power module PM2 which includes a switching element 202 and a switching element control circuit 102); and a power circuit 400. The power conversion device 1 according to the embodiment 1 is covered by a package formed of a resin, a ceramic or the like having high heat resistance and high insulation property. Each power module PM1 (PM2) includes: a (+) side input terminal T11 (T21) to which a power source voltage $V_{DD}$ of a direct current is inputted; a (−) side input terminal T12 (T22) on a ground side; a (+) side output terminal T13 (T23); a (−) side output terminal T14

(T24) on a ground side; a control terminal T15 (T25) to which a drive signal Pg (for example, a gate pulse) is inputted; and a terminal T16 (T26) to and from which a temperature comparison signal is inputted and outputted.

A gate drive power source 300 for applying a power source voltage $V_{DD}$ is connected between the (+) side input terminal T11 (T21) and the (−) side input terminal T12 (T22). The gate drive power source 300 is connected to a gate electrode of the switching element 200 (202) via a gate voltage control part 10 (12), and supplies a voltage to the gate electrode. The power circuit 400 is connected to the (+) side output terminal T13 (T23) and the (−) side output terminal T14 (T24). That is, two sets of power modules PM1, PM2 are connected in parallel between the gate drive power source 300 for applying the power source voltage $V_{DD}$ and the power circuit 400.

The power circuit 400 is connected in series with the switching elements 200, 202. The power circuit 400 has a load resistor 410 and a drive power source 420 of a direct current, and the load resistor 410 and the drive power source 420 of a direct current are connected in series between the (+) side output terminals T13, T23 and the (−) side output terminals T14, T24. The (−) side output terminals T14, T24 are grounded.

The switching elements 200, 202 of each power module PM1, PM2 is a MOSFET having a source electrode (second electrode), a drain electrode (first electrode), and a gate electrode (third electrode). The switching element 200, 202 is brought into an ON state when a gate voltage (third electrode voltage) which exceeds a threshold voltage is applied to the gate electrode, and is brought into an OFF state when the gate voltage becomes lower than a threshold voltage. The gate voltage is supplied from the power source voltage $V_{DD}$, and is controlled by the gate voltage control part 10, 12. In this embodiment 1, a MOSFET is used as the switching element 200, 202. However, a suitable switching element can be used as the switching element 200, 202. The switching element 200, 202 is formed using a material which contains GaN. When the switching element 200, 202 is formed using a material which contains GaN, a difference between an absolute maximum rated voltage and a threshold voltage of the gate electrode becomes small.

The drain electrode of the switching element 200, 202 is connected to the power circuit 400 via the (+) side output terminal T13, T23. The gate electrode of the switching element 200, 202 is connected to the gate voltage control part 10, 12. The source electrode of the switching element 200, 202 is connected to the (−) side output terminal T14, T24 via a resistor.

The power module PM1 includes the gate voltage control part 10 (third electrode voltage control part), a temperature detection part 20, a temperature comparison part 30, a memory part 40, and a threshold voltage calculation part 50 (see FIG. 1).

The gate voltage control part 10 is connected to the threshold voltage calculation part 50, the memory part 40, and the temperature comparison part 30. The gate voltage control part 10 controls a gate voltage for controlling turning on/off of the switching element 200 based on an inputted drive signal Pg.

The temperature detection part 20 has a temperature detection element TD and is connected to the threshold voltage calculation part 50 and the temperature comparison part 30. As the temperature detection element TD, a suitable temperature detection element such as a diode or a thermistor can be used.

The temperature comparison part 30 is described later.

The memory part 40 is connected to the gate voltage control part 10 and the threshold voltage calculation part 50. The memory part 40 stores in advance information including an initial threshold voltage $Vth_{O1}$ of the switching element 200 (a lower limit value of a threshold voltage of the switching element 200 to be used which is set in advance) and an initial temperature $T_{O1}$ of the switching element 200 when the initial threshold voltage $Vth_{O1}$ is measured (an initial threshold voltage measurement temperature which is set in advance), and information relating to a temperature characteristic of the threshold voltage of the switching element 200. Accordingly, it is unnecessary to measure the initial threshold voltage $Vth_{O1}$ and the initial temperature $T_{O1}$ after the switching element 200 is incorporated into the power module PM1.

Figure 3:
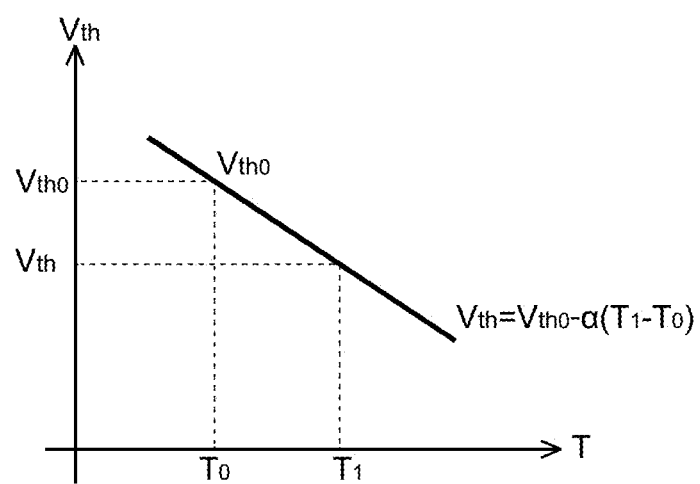
FIG. 3 is a schematic view of a graph indicating a relationship between a threshold voltage Vth and an operation temperature T of a switching element.

Information relating to a temperature characteristic of a threshold voltage of the switching element 200 is a characteristic equation which satisfies a relationship of $Vth=Vth_0-\alpha(T_1-T_0)$ assuming a temperature coefficient of a threshold voltage of the switching element 200 as $\alpha$, a threshold voltage during operation of the switching element 200 as $Vth$, an initial threshold voltage as $Vth_0$, an operation temperature of the switching element 200 detected by the temperature detection part 20 as $T_1$, an initial temperature of the switching element 200 when the initial threshold voltage $Vth_0$ is measured as $T_0$ (see FIG. 3). That is, the relationship between the threshold voltage $Vth$ and the operation temperature $T$ of the switching element 200 is expressed by a linear function having a negative gradient.

The threshold voltage calculation part 50 reads information including an initial threshold voltage $Vth_{O1}$ of the switching element 200 and an initial temperature $T_{O1}$ of the switching element 200 when the initial threshold voltage $Vth_{O1}$ is measured, and information relating to a temperature characteristic of a threshold voltage of the switching element 200 from the memory part 40, reads an operation temperature $T_1$ of the switching element 200 from the temperature detection part 20, and calculates a threshold voltage $Vth_1$ during operation by putting these information and values into the characteristic equation of $Vth=Vth_0-\alpha(T_1-T_0)$ by setting $Vth_0=Vth_{O1}$, $Vth=Vth_1$, and $T_0=T_{O1}$.

The temperature comparison part 30 calculates an average operation temperature aveT of all switching elements 200, 202 (all switching elements controlled by a switching element control circuit) in the power conversion device 1, and compares an operation temperature $T_1$ of the corresponding switching element 200 with the average operation temperature aveT. To be more specific, the temperature comparison part 30 transmits the operation temperature $T_1$ of the switching element 200 detected by the temperature detection part 20 to the temperature comparison part 32 of the power module PM2, receives an operation temperature $T_2$ of the switching element 202 transmitted from the temperature comparison part 32 of the power module PM2, calculates the average operation temperature aveT, and calculates a difference between the average operation temperature aveT and the operation temperature $T_1$ of the switching element 200.

When the operation temperature $T_1$ of the switching element 200 is lower than the average operation temperature aveT, the temperature comparison part 30 transmits a signal which increases a gate voltage by an increment which corresponds to a temperature difference between the operation temperature $T_1$ of the switching element 200 and the average operation temperature aveT to the gate voltage control part 10. When the operation temperature $T_1$ of the switching element 200 is higher than the average operation temperature aveT, the temperature comparison part 30 transmits a signal which decreases a gate voltage by a decrement which corresponds to a temperature difference between the operation temperature $T_1$ of the switching element 200 and the average operation temperature aveT to the gate voltage control part 10.

The power module PM2 includes the gate voltage control part 12 (third electrode voltage control part), a temperature detection part 22, the temperature comparison part 32, a memory part 42, and a threshold voltage calculation part 52 (see FIG. 1). The configurations of the gate voltage control part 12 (third electrode voltage control part), the temperature detection part 22, the memory part 42, and the threshold voltage calculation part 52 are substantially equal to the corresponding configurations of the power module PM1. Accordingly, the description of these configurations is omitted.

The temperature comparison part 32 calculates an average operation temperature aveT of all switching elements 200, 202 in the power conversion device 1, and compares an operation temperature $T_2$ of the corresponding switching element 202 with the average operation temperature aveT. To be more specific, the temperature comparison part 32 transmits the operation temperature $T_2$ of the switching element 202 detected by the temperature detection part 22 to the temperature comparison part 30 of the power module PM1, receives an operation temperature $T_1$ of the switching element 200 transmitted from the temperature comparison part 30 of the power module PM1, calculates the average operation temperature aveT, and calculates a difference between the average operation temperature aveT and the operation temperature $T_2$ of the switching element 202.

When the operation temperature $T_2$ of the switching element 202 is lower than the average operation temperature aveT, the temperature comparison part 32 transmits a signal which increases a gate voltage by an increment which corresponds to a temperature difference between the operation temperature $T_2$ of the switching element 202 and the average operation temperature aveT to the gate voltage control part 12. When the operation temperature $T_2$ of the switching element 202 is higher than the average operation temperature aveT, the temperature comparison part 32 transmits a signal which decreases a gate voltage by a decrement which corresponds to a temperature difference between the operation temperature $T_2$ of the switching element 202 and the average operation temperature aveT to the gate voltage control part 12.

In bringing the switching element 200 into an ON state, the power conversion device 1 according to the embodiment 1 decides a gate voltage applied to the gate electrode as follows. In this embodiment, although the case where a gate voltage is applied to the gate electrode in the power module PM1 is described, substantially the same operation is performed also in the power module PM2.

(1) Calculation of Threshold Voltage During Operation

First, the temperature detection part 20 detects an operation temperature $T_1$ of the switching element 200 via the temperature detection element TD.

The threshold voltage calculation part 50 reads information including an initial threshold voltage $Vth_{01}$ of the switching element 200 and an initial temperature $T_{01}$ of the switching element 200 when the initial threshold voltage $Vth_{01}$ is measured, and information relating to a temperature characteristic of a threshold voltage of the switching element 200 from the memory part 40, and reads an operation temperature $T_1$ of the switching element 200 from the temperature detection part 20, and calculates a threshold voltage $Vth_1$ during operation by putting these information and values into the characteristic equation of $Vth=Vth_0-\alpha(T_1-T_0)$ by setting $Vth_0=Vth_{01}$, $Vth=Vth_1$, and $T_0=T_{01}$.

(2) Comparison of Temperature

The temperature comparison part 30 calculates an average operation temperature aveT of all switching elements 200, 202 in the power conversion device 1, and compares an operation temperature $T_1$ of the corresponding switching element 200 with the average operation temperature aveT. To be more specific, the temperature comparison part 30 transmits the operation temperature $T_1$ of the switching element 200 detected by the temperature detection part 20 to the temperature comparison part 32 of the power module PM2, receives an operation temperature $T_2$ of the switching element 202 transmitted from the temperature comparison part 32 of the power module PM2, calculates the average operation temperature aveT, and calculates a difference between the average operation temperature aveT and the operation temperature $T_1$ of the switching element 200.

When the operation temperature $T_1$ of the switching element 200 is lower than the average operation temperature aveT, the temperature comparison part 30 transmits a signal which increases a gate voltage by an increment which corresponds to a temperature difference between the operation temperature $T_1$ of the switching element 200 and the average operation temperature aveT (a signal which corrects a gate voltage Vgs) to the gate voltage control part 10. When the operation temperature $T_1$ of the switching element 200 is higher than the average operation temperature aveT, the temperature comparison part 30 transmits a signal which decreases a gate voltage by a decrement which corresponds to a temperature difference between the operation temperature $T_1$ of the switching element 200 and the average operation temperature aveT to the gate voltage control part 10.

Figure 4A:
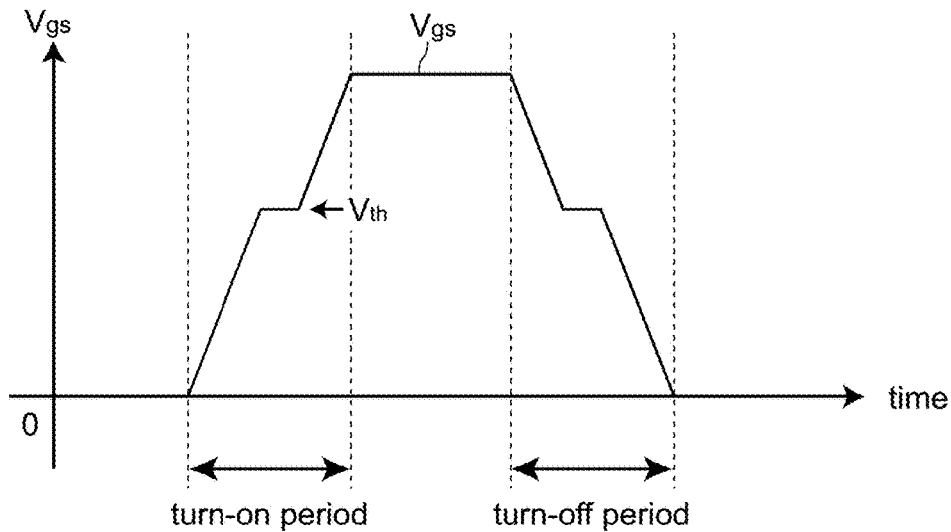
FIGS. 4A and 4B are schematic views of graphs of a change with time of a gate voltage (a gate-source voltage) Vgs describing an effect when a gate voltage which slightly exceeds a threshold voltage is applied to a gate electrode.
Figure 4B:
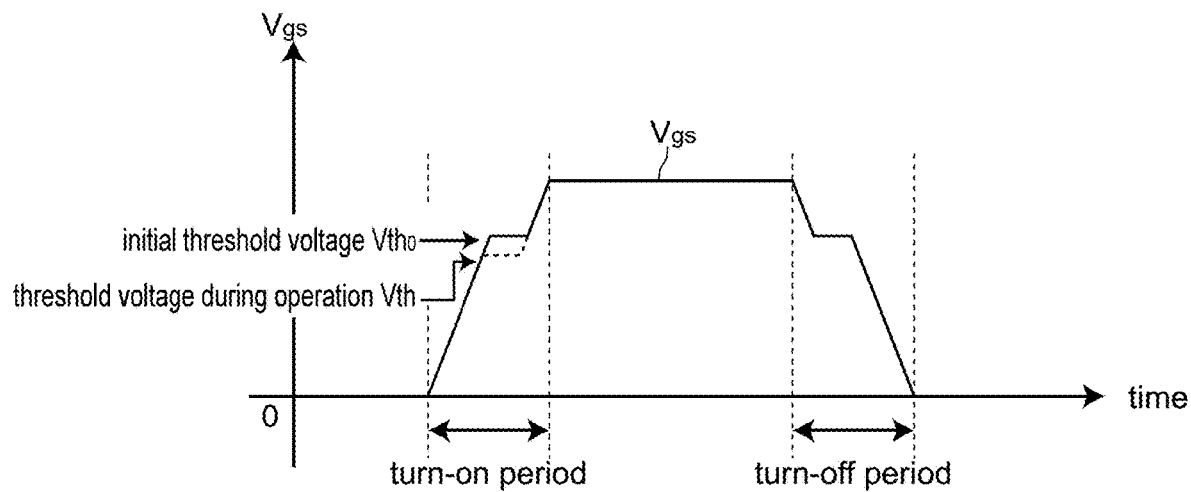
Figure 5:
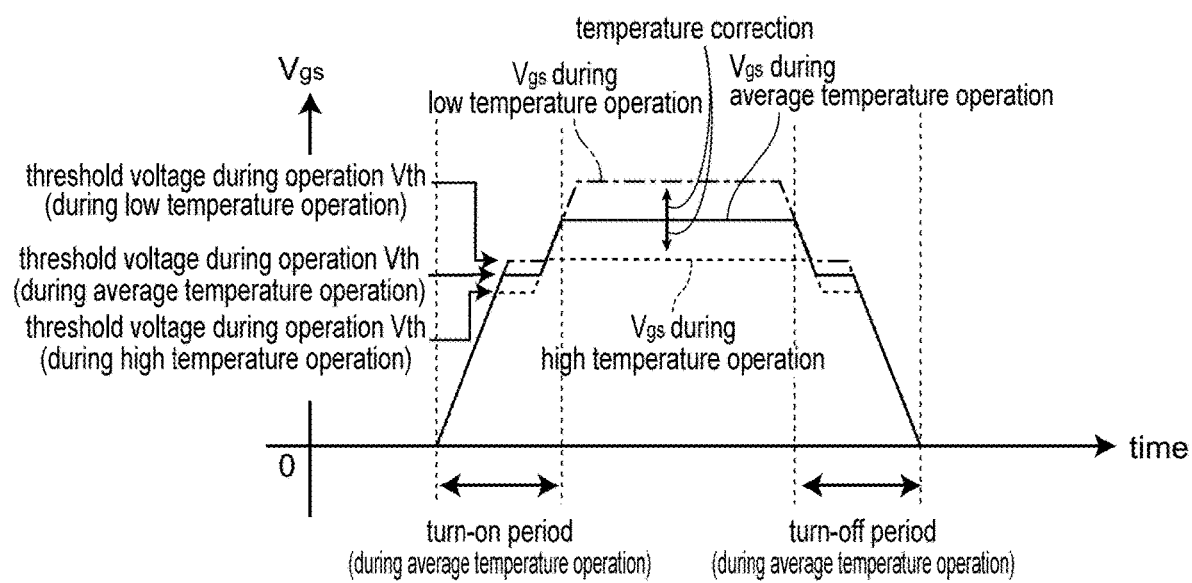
FIG. 5 is a schematic view of a graph for describing a change with time of a temperature of the switching element and the gate-source voltage Vgs.

The gate voltage control part 10 applies a gate voltage which is corrected based on a threshold voltage $Vth_1$ during operation calculated by the threshold voltage calculation part 50 and a signal which increases or decreases the gate voltage by an increment or decrement which corresponds to a temperature difference between an average operation temperature aveT and an operation temperature $T_1$ of the switching element 200 transmitted from a temperature comparison part 30, that is, based on the threshold voltage $Vth_1$ and the increment or decrement which corresponds to the temperature difference between the operation temperature $T_1$ and the average operation temperature aveT (see FIG. 4B and FIG. 5) to the gate electrode.

In each power module, a gate voltage may be controlled constantly following a temperature of the switching element 200, 202, or a threshold voltage during operation is calculated by detecting an operation temperature of each switching element 200, 202 at a predetermined time interval, and may control a gate voltage based on the threshold voltage during the operation.

2. Advantageous Effects Acquired by Power Conversion Device 1 According to Embodiment 1

In the power conversion device 1 according to the embodiment 1, the gate voltage control part 10, 12 of each switching element control circuit 100, 102 controls the gate voltage based on information including an operation temperature $T_1$, $T_2$ of the switching element 200, 202 detected by the temperature detection part 20, 22, and a threshold voltage $Vth_1$, $Vth_2$ during operation calculated based on the operation temperature $T_1$, $T_2$. Accordingly, even when the threshold voltage $Vth_1$, $Vth_2$ during the operation changes from an initial threshold voltage $Vth_{01}$, $Vth_{02}$ due to a fact that the operation temperature $T_1$, $T_2$ of the switching element 200, 202 during the operation becomes higher than the initial temperature $T_{01}, T_{02}$ of the switching element 200, 202 when an initial threshold voltage $Vth_{01}, Vth_{02}$ is measured, it is possible to apply a voltage which slightly exceeds the threshold voltage $Vth_1, Vth_2$ during the operation to the gate electrode. As a result, compared to a case where the gate voltage is controlled using a designed threshold voltage, a turn-on period and a turn-off period can be shortened and hence, a switching loss of the switching element 200, 202 can be reduced.

Further, in the power conversion device 1 according to the embodiment 1, each gate voltage control part 10, 12 controls the gate voltage based on information including the average operation temperature aveT, an operation temperature $T_1, T_2$ of the switching element detected by the temperature detection part 20, 22, and a threshold voltage $Vth_1, Vth_2$ calculated based on the operation temperature $T_1, T_2$ and hence, the gate voltage can be controlled based on a temperature difference between the average operation temperature aveT and an operation temperature $T_1, T_2$ of each switching element. Accordingly, even when irregularities occur in an operation temperature of each switching element 200, 202, irregularities minimally occurs in a balance of currents distributed to each switching element 200, 202. Accordingly, it is possible to prevent rapid deterioration of the switching element of a high temperature. As a result, even when the power conversion device is operated in a state where a plurality of power modules are connected in parallel to each other, the lifetime of the power conversion device can be prolonged.

Further, in the power conversion device 1 according to the embodiment 1, the temperature comparison part 30, 32 transmits a signal which increases the gate voltage to the gate voltage control part 10, 12 when an operation temperature $T_1, T_2$ of the corresponding switching element is lower than the average operation temperature aveT so that the gate voltage is increased (see a chain line in FIG. 5) whereby an ON resistance is decreased and an amount of current which flows through the corresponding switching element is increased. Accordingly, a state is brought about where a balance is taken between an amount of current of the switching element and an amount of current of the other switching element which has a high temperature and through which a large amount of current flows. Accordingly, it is possible to prevent a specified switching element (the switching element of a high temperature) from being deteriorated earlier and hence, the lifetime of the device can be easily prolonged.

Further, in the power conversion device 1 according to the embodiment 1, the temperature comparison part 30, 32 transmits a signal which decreases the gate voltage to the gate voltage control part 10, 12 when the operation temperature $T_1, T_2$ of the corresponding switching element is higher than the average operation temperature aveT so that the gate voltage is decreased (see a broken line in FIG. 5) whereby an ON resistance is increased and an amount of current which flows through the corresponding switching element is decreased. Accordingly, a state is brought about where a balance is taken between an amount of current of the switching element and an amount of current of the other switching element which has a low temperature and through which a small amount of current flows. Accordingly, it is possible to prevent a specified switching element (the switching element of a high temperature) from being deteriorated earlier and hence, the lifetime of the device can be easily prolonged.

Further, in the power conversion device 1 according to the embodiment 1, each temperature comparison part 30, 32 transmits a signal which increases the gate voltage to the gate voltage control part by an increment which corresponds to a temperature difference between an operation temperature $T_1, T_2$ of the corresponding switching element and the average operation temperature aveT when the operation temperature $T_1, T_2$ of the corresponding switching element 200, 202 is lower than the average operation temperature aveT. Each temperature comparison part 30, 32 transmits a signal which decreases the gate voltage to the gate voltage control part 10, 12 by a decrement corresponding to a temperature difference between an operation temperature $T_1, T_2$ of the switching element 200, 202 and the average operation temperature aveT when the operation temperature $T_1, T_2$ of the switching element 200, 202 is higher than the average operation temperature aveT. With such an operation, a state is brought about where a difference between an amount of current of the corresponding switching element and an amount of current of the switching element other than the corresponding switching element is small. Accordingly, it is possible to prevent with certainty a specified switching element (a switching element of a high temperature) from being deteriorated earlier (that is, lifetimes of the switching elements being made substantially equal easily). As a result, the lifetime of the device can be further prolonged.

Further, in the power conversion device 1 according to the embodiment 1, in the temperature detection part 20, 22, a thermistor is used as a temperature detection element. Accordingly, an operation temperature of the switching element can be detected with high accuracy and easily.

In the power conversion device 1 according to the embodiment 1, the threshold voltage calculation part 50 calculates a threshold voltage $Vth_1$ during the operation of the switching element 200 based on information including an operation temperature $T_1$ of the switching element 200 detected by the temperature detection part 20, and the gate voltage control part 10 controls a gate voltage based on a threshold voltage $Vth_1$ during the operation of the switching element 200 calculated by the threshold voltage calculation part 50 when the switching element 200 is brought into an ON state. Accordingly, even when a threshold voltage $Vth_1$ during operation changes from an initial threshold voltage $Vth_{01}$ due to a fact that an operation temperature $T_1$ of the switching element 200 during operation becomes higher than an initial temperature $T_{01}$ of the switching element 200 when the initial threshold voltage $Vth_{01}$ is measured, it is possible to apply a voltage which slightly exceeds the threshold voltage $Vth_1$ during the operation to the gate electrode. Accordingly, a turn-on period and a turn-off period can be shortened and hence, a switching loss can be reduced (substantially the same operation being performed and substantially the same advantageous effects being acquired also in the power module PM2).

Further, in the power conversion device 1 according to the embodiment 1, assuming a temperature coefficient of a threshold voltage of the switching element 200 as α, a threshold voltage during operation of the switching element 200 as Vth, an initial threshold voltage as $Vth_0$, the operation temperature of the switching element detected by the temperature detection part as T, and an initial temperature of the switching element when the initial threshold voltage is measured as $T_0$, information relating to a temperature characteristic of the threshold voltage of the switching element 200 is a characteristic equation which satisfies the relationship of $Vth=Vth_0-\alpha(T-T_0)$. Accordingly, the threshold voltage Vth during the operation of the switching element 200 can be calculated relatively easily (substantially the same operation being performed and substantially the same advantageous effects being acquired also in the power module PM2).

Further, in the power conversion device 1 according to the embodiment 1, even when a difference between an absolute maximum rated voltage and a threshold voltage of the gate electrode is small as in the case of a switching element formed using a material which contains GaN, it is possible to apply a voltage which slightly exceeds a threshold voltage Vth during operation to the gate electrode. Accordingly, a turn-on period and a turn-off period can be shortened and hence, a switching loss can be reduced. Further, it is also possible to prevent the occurrence of a phenomenon where the switching elements 200, 202 are not brought into an ON state even when a gate voltage which slightly exceeds a threshold voltage (designed threshold voltage) is applied to the gate electrode. As a result, an ON/OFF operation of the switching element 200, 202 can be controlled with certainty.

In the power conversion device 1 according to the embodiment 1, the switching elements 200, 202 are formed using a material which contains GaN. Accordingly, an ON resistance of each of the switching elements 200, 202 is lowered and hence, it is possible to provide a power conversion device having a small conduction loss.

Embodiment 2

A power conversion device 2 according to the embodiment 2 basically has substantially the same configuration as the power conversion device 1 according to the embodiment 1. However, the power conversion device 2 according to the embodiment 2 differs from the power conversion device 1 according to the embodiment 1 in the configuration of a switching element control circuit. That is, in the power conversion device 2 according to the embodiment 2, each switching element control circuit 100, 102 further includes a threshold voltage measurement power source 60, 62, a switching current detection part 70, 72 and an ON/OFF state determination part 80, 82, and the switching element control circuit 100, 102 performs an operation by switching an operation mode between an initial threshold voltage measurement mode where an initial threshold voltage $Vth_{01}$, $Vth_{02}$ of the switching element 200, 202 is measured, and a control mode where an ON/OFF operation of the switching element 200, 202 is controlled (see FIG. 6 and FIG. 7).

Although the description is made with respect to the switching element control circuit 100 of a power module PM1 hereinafter, the switching element control circuit 102 of a power module PM2 has substantially the same configuration and performs substantially the same operation.

The threshold voltage measurement power source 60 is connected to a drain electrode of the switching element 200, and supplies a threshold voltage measurement current to the drain electrode (first electrode) of the switching element 200 by turning on a threshold voltage measurement switch SW1 in the initial threshold voltage measurement mode.

A suitable switch such as a photocoupler, for example, can be used as a threshold voltage measurement switch SW1.

The switching current detection part (first electrode current detection part) 70 is connected to a source electrode of the switching element 200, and detects a switching current (a first electrode current, a drain current, a source current) Id of the switching element 200 in the initial threshold voltage measurement mode. The switching current detection part 70 is connected to the ON/OFF state determination part 80 described later. The switching current detection part 70 measures a current by converting the current into a voltage by supplying the current to a resistor connected to the source electrode of the switching element 200. However, the switching current detection part 70 may use a suitable detection device.

The ON/OFF state determination part 80, in the initial threshold voltage measurement mode, determines an ON/OFF state of the switching element 200 based on a detection result received from the switching current detection part 70. The ON/OFF state determination part 80 is connected to the switching current detection part 70 and a gate voltage control part 10.

A memory part 40 is connected to not only the gate voltage control part 10 and the threshold voltage calculation part 50 but also to a temperature detection part 20.

In the power conversion device 2 according to the embodiment 2, each power module performs the following operation. The description is made hereinafter by taking the case where the power module PM1 is operated as an example.

(1) Initial Threshold Voltage Measurement Mode

The initial threshold voltage measurement mode is a mode where an initial threshold voltage $Vth_{01}$ of the switching element 200 is measured. This mode is performed before the switching element control circuit 100 and the switching element 200 are driven.

Figure 6:
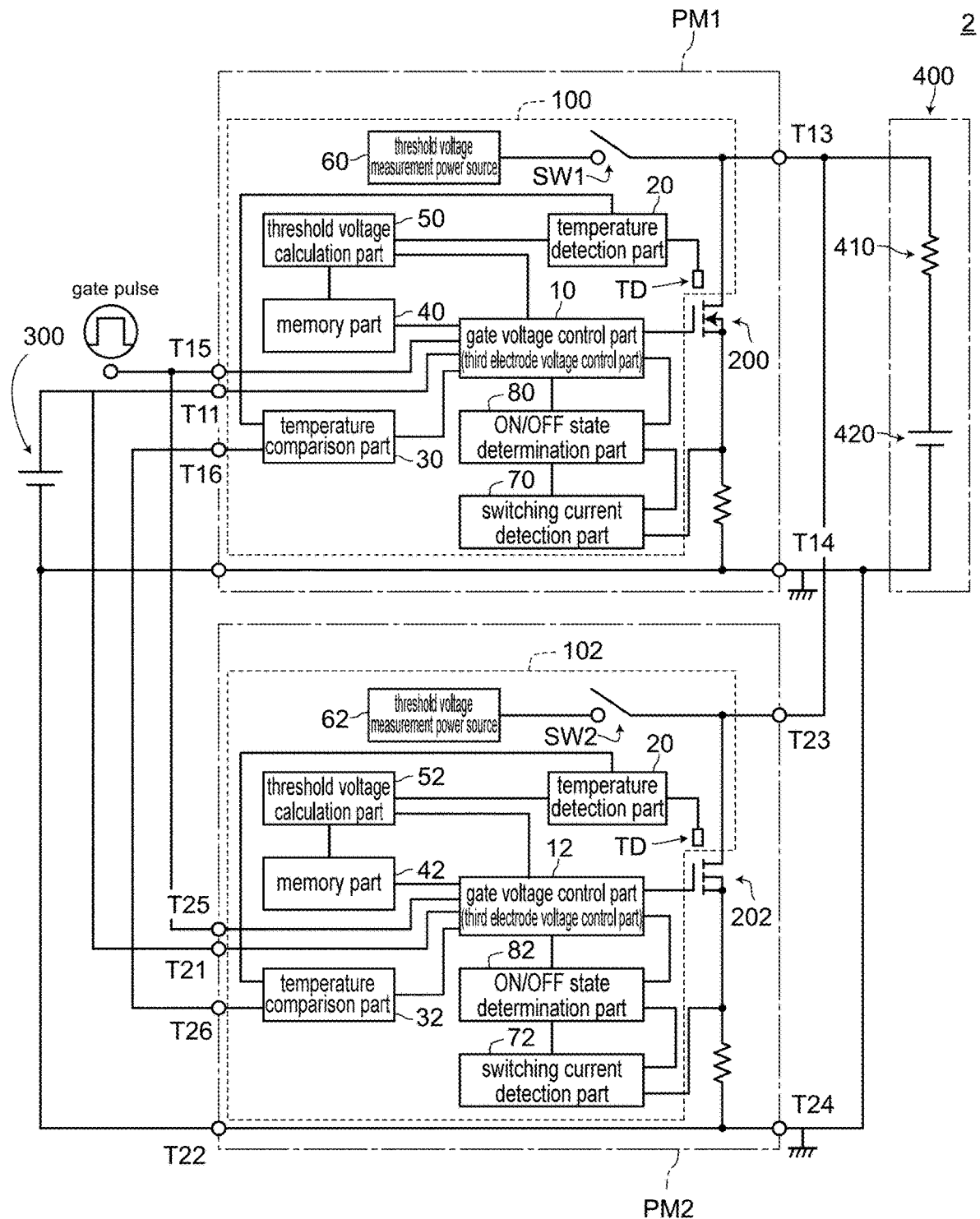
FIG. 6 is a circuit diagram of a power conversion device 2 according to an embodiment 2.
Figure 7:
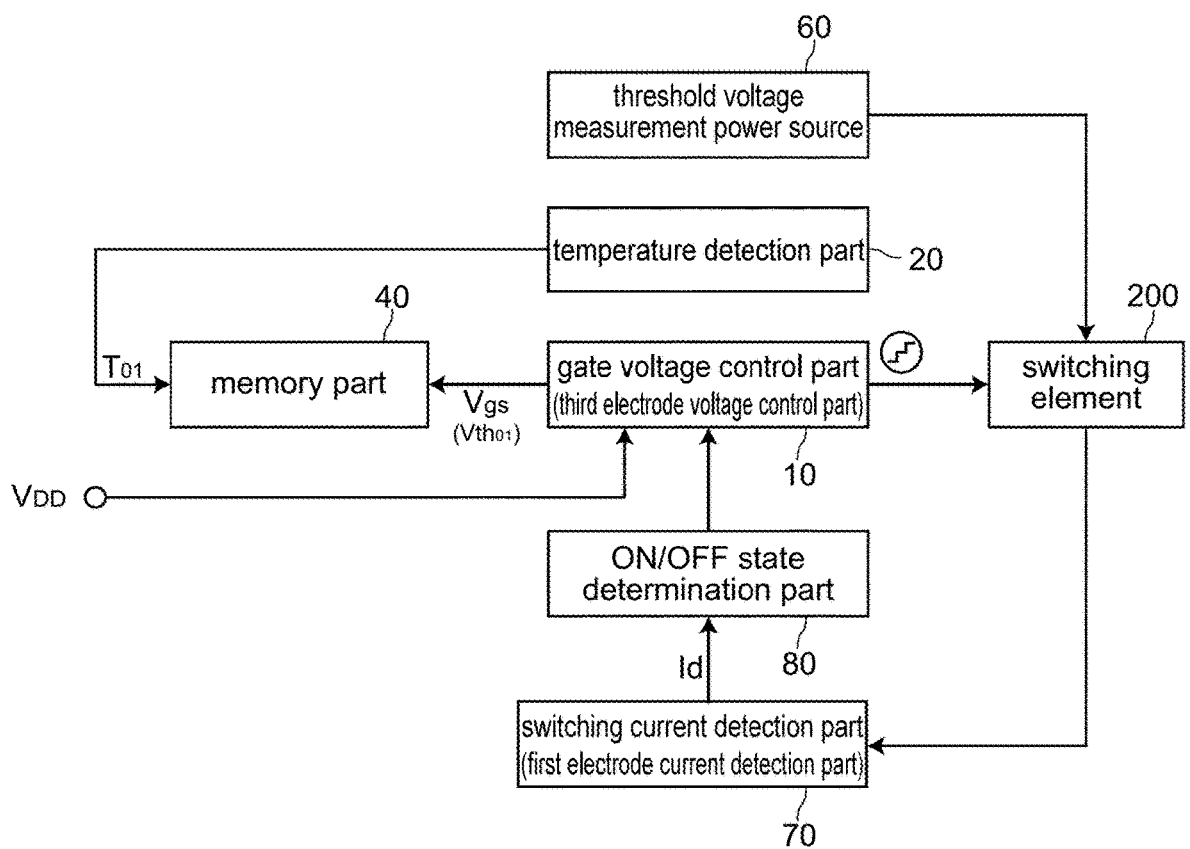
FIG. 7 is a block diagram of an initial threshold voltage measurement mode in a power module PM1 according to the embodiment 2.

First, a threshold voltage measurement current is supplied to the drain electrode of the switching element 200 from the threshold voltage measurement power source 60 in a state where a current is not supplied from a drive power source 420 (see FIG. 6 and FIG. 7).

Figure 8:
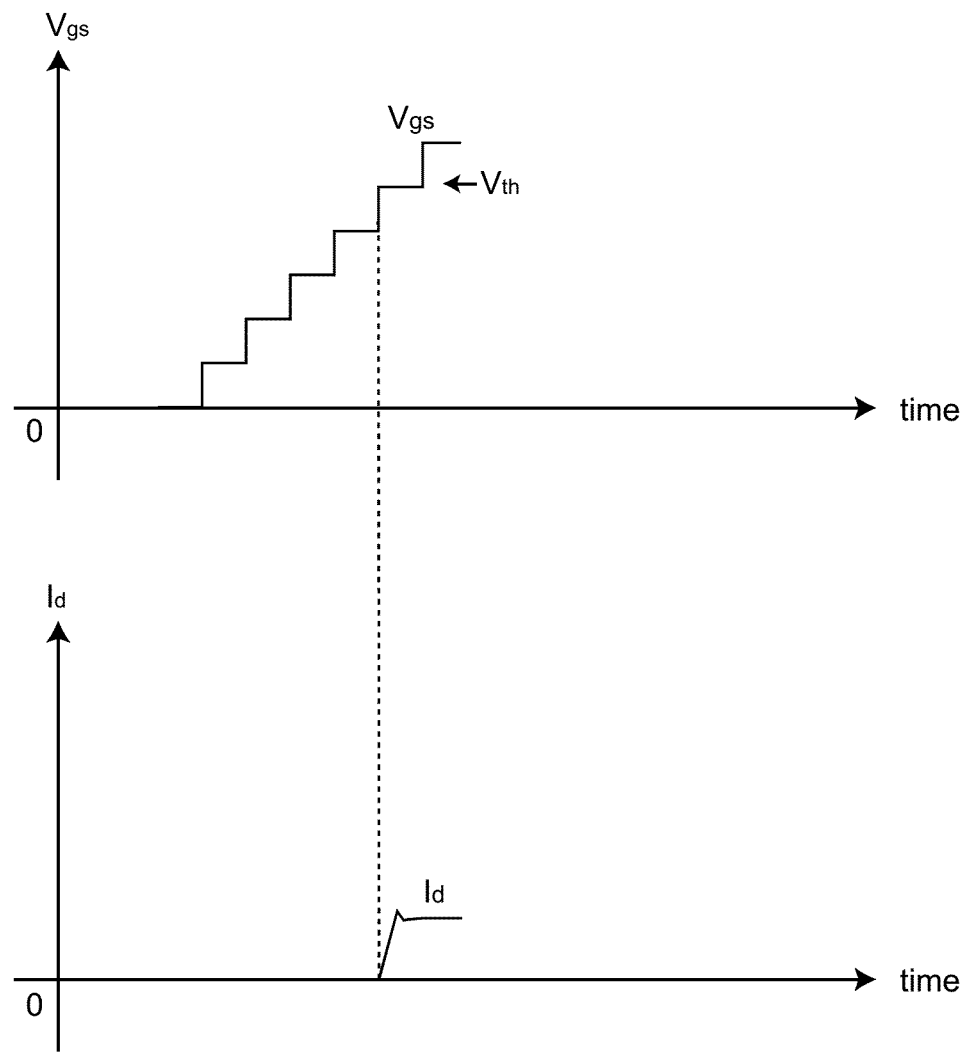
FIG. 8 is a schematic view of a graph of a gate-source voltage Vgs for describing an initial threshold voltage measurement mode in the power module PM1 according to the embodiment 2.

Next, the gate voltage control part 10 controls a gate voltage such that a voltage lower than a scheduled initial threshold voltage which is set at the time of designing the power module is applied to a gate electrode. At this stage of operation, a switching current is not detected by the switching current detection part 70 (a value of the switching current being 0) and hence, the ON/OFF state determination part 80 determines that the switching element 200 is in an OFF state. When the ON/OFF state determination part 80 determines that the switching element 200 is in an OFF state, the gate voltage control part 10 controls the gate voltage such that the gate voltage is increased by one stage (see FIG. 8).

When the gate voltage is increased in stages (specifically being increased in a stepwise manner) by repeating such an operation so that the switching current is detected by the switching current detection part 70 (the switching current taking a value other than 0), the ON/OFF state determination part 80 determines that the switching element 200 is in an ON state. At this stage of operation, an operation temperature of the switching element 200 detected by the temperature detection part 20 is transmitted to the memory part 40 as an initial temperature $T_{01}$, and the gate voltage control part 10 transmits a gate-source voltage Vgs applied to the gate electrode to the memory part 40 as an initial threshold voltage $Vth_{01}$. The memory part 40 stores the gate-source voltage Vgs as an initial threshold voltage $Vth_{01}$.

(2) Control Mode

In the control mode, when the switching element 200 is brought into an ON state, a threshold voltage $Vth_1$ during operation is calculated based on the initial threshold voltage $Vth_{01}$ measured in the initial threshold voltage measurement mode, the initial temperature $T_{01}$ of the switching element 200, an operation temperature $T_1$ of the switching element 200 detected by the temperature detection part 20, and information relating to a temperature characteristic of a threshold voltage of the switching element which is stored in the memory part 40 in advance (temperature coefficient α) (by putting these values and information into a characteristic equation of ($Vth_1 = Vth_{O1} - \alpha(T_1 - T_{O1})$)). The gate voltage control part 10 applies a gate voltage which is corrected based on a threshold voltage $Vth_1$ during operation calculated by the threshold voltage calculation part 50 and a signal which increases or decreases the gate voltage by an increment or decrement which corresponds to a temperature difference between an average operation temperature aveT and an operation temperature $T_1$ of the switching element 200, that is, based on the threshold voltage $Vth_1$ (see FIG. 4B) and the increment or decrement which corresponds to the temperature difference between the operation temperature $T_1$ and the average operation temperature aveT to the gate electrode.

In this manner, the power conversion device 2 according to the embodiment 2 differs from the power conversion device 1 according to the embodiment 1 in the configuration of the switching element control circuit. However, in the same manner as the power conversion device 1 according the embodiment 1, in the power conversion device 2 according to the embodiment 2, the gate voltage control part 10, 12 of each switching element control circuit 100, 102 controls the gate voltage based on information including an operation temperature $T_1$, $T_2$ of the switching element 200, 202 detected by the temperature detection part 20, 22, and a threshold voltage $Vth_1$, $Vth_2$ during operation calculated based on the operation temperature $T_1$, $T_2$. Accordingly, even when the threshold voltage $Vth_1$, $Vth_2$ during the operation changes from an initial threshold voltage $Vth_{O1}$, $Vth_{O2}$ due to a fact that the operation temperature $T_1$, $T_2$ of the switching element 200, 202 during the operation becomes higher than the initial temperature $T_{O1}$, $T_{O2}$ of the switching element 200, 202 when an initial threshold voltage $Vth_{O1}$, $Vth_{O2}$ is measured, it is possible to apply a voltage which slightly exceeds the threshold voltage $Vth_1$, $Vth_2$ during the operation to the gate electrode. As a result, compared to a case where the third electrode voltage is controlled using a designed threshold voltage, a turn-on period and a turn-off period can be shortened and hence, a switching loss of the switching element 200, 202 can be reduced.

Further, in the power conversion device 2 according to the embodiment 2, the gate voltage control part 10, 12 controls the gate voltage based on information including the average operation temperature aveT, an operation temperature $T_1$, $T_2$ of the switching element detected by the temperature detection part 20, 22, and a threshold voltage calculated based on the operation temperature $T_1$, $T_2$ and hence, the gate voltage can be controlled based on a temperature difference between the average operation temperature aveT and an operation temperature $T_1$, $T_2$ of the corresponding switching element. Accordingly, even when irregularities occur in an operation temperature $T_1$, $T_2$ of each switching element 200, 202, irregularities minimally occurs in a balance of currents distributed to each switching element 200, 202. Accordingly, it is possible to prevent rapid deterioration of the switching element of a high temperature. As a result, even when the power conversion device is operated in a state where a plurality of power modules are connected in parallel to each other, the lifetime of the power conversion device can be prolonged.

In the power conversion device 2 according to the embodiment 2, in the initial threshold voltage measurement mode, an actual threshold voltage of each switching element 200, 202 can be measured. Accordingly, even when an actual threshold voltage changes from a designed threshold voltage due to irregularities in the manufacture of the switching element, it is possible to apply a gate voltage which slightly exceeds the actual threshold voltage to the gate electrode based on the actual threshold voltage when the switching element 200, 202 is brought into an ON state. Accordingly, compared to a case where a gate voltage which largely exceeds a threshold voltage is applied to the gate electrodes of the switching element 200, 202 for controlling an ON/OFF operation of the switching element 200, 202 (comparison example, see FIG. 4A), a turn-on period and a turn-off period can be shortened and hence, a switching speed of the switching element 200, 202 can be increased. As a result, a switching loss of the switching element 200, 202 can be reduced.

Further, in the power conversion device 2 according to the embodiment 2, when the switching element 200, 202 is brought into an ON state as described above, a gate voltage which slightly exceeds an actual threshold voltage can be applied to the gate electrode based on the actual threshold voltage. Accordingly, even in the case where the actual threshold voltage changes in a direction that the actual threshold voltage becomes higher than a designed threshold voltage due to irregularities in manufacture of the switching element 200, a gate voltage which slightly exceeds the actual threshold voltage can be applied to the gate electrode. Accordingly, it is possible to prevent the occurrence of a phenomenon that the switching element 200, 202 is not brought into an ON state even when a gate voltage which slightly exceeds a threshold voltage (designed threshold voltage) is applied to the gate electrode. As a result, an ON/OFF operation of the switching element 200 can be controlled with certainty.

Particularly, even in the case where, in the switching element 200, 202, a difference between an absolute maximum rated voltage and a threshold voltage is small (as in the case where the switching element 200, 202 is formed using a material which contains GaN), a gate voltage which slightly exceeds an actual threshold voltage can be applied to the gate electrode and hence, it is possible to prevent the occurrence of the phenomenon that the switching element 200, 202 is not brought into an ON state even when the gate voltage which slightly exceeds the threshold voltage (designed threshold voltage) is applied to the gate electrode. As a result, an ON/OFF operation of the switching element 200, 202 can be controlled with certainty.

Further, in the power conversion device 2 according to the embodiment 2, an actual threshold voltage can be measured in the initial threshold voltage measurement mode, and a gate voltage applied to the gate electrode can be controlled based on information including an actual threshold voltage when the switching element is brought into an ON state in the control mode. Accordingly, even when the switching element 200, 202 is manufactured on a mass production basis, before the switching element 200, 202 is connected to the switching element control circuit 100, 102, it is unnecessary to measure threshold voltages of the manufactured respective switching elements. Accordingly, an operation of manufacturing the switching element does not become cumbersome and hence, productivity can be easily enhanced.

In the power conversion device 2 according to the embodiment 2, the gate voltage control part 10, 12, in the initial threshold voltage measurement mode, controls a gate voltage such that the gate voltage is increased in a stepwise manner along with a lapse of time. Accordingly, threshold voltage of the switching element 200, 202 can be measured efficiently and with certainty.

The power conversion device 2 according to the embodiment 2 has substantially the same configuration as the power conversion device 1 according to the embodiment 1 with respect to points other than the point that the configuration of the switching element control circuit of the power conversion device 2 differs from the configuration of the switching element control circuit of the power conversion device 1. Accordingly, the power conversion device 2 according to the embodiment 2 acquires the corresponding advantageous effects found amongst all advantageous effects which the power conversion device 1 according to the embodiment 1 acquires.

Embodiment 3

Figure 9:
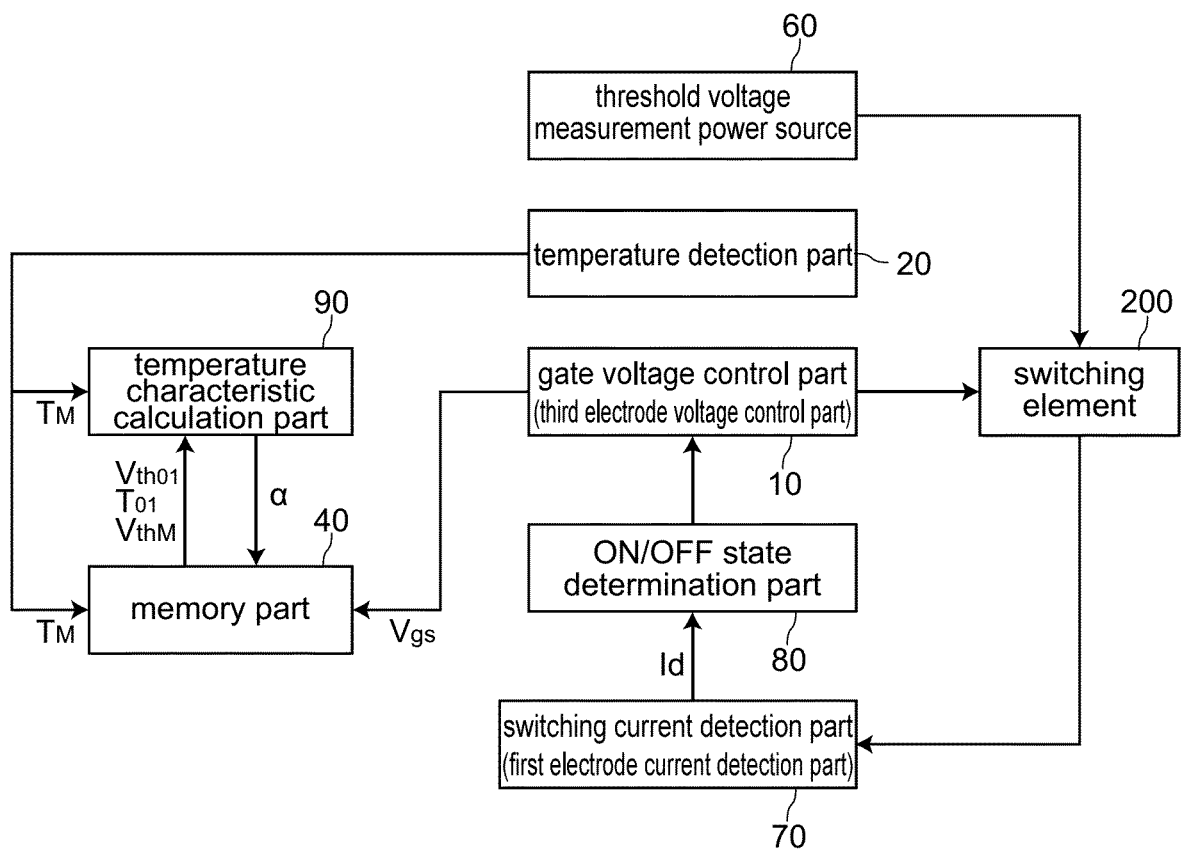
FIG. 9 is a block diagram of a temperature characteristic measurement mode in a power module PM1 according to an embodiment 3.

A power conversion device according to the embodiment (not shown in the drawings) basically has substantially the same configuration as the power conversion device 2 according to the embodiment 2. However, the power conversion device according to the embodiment 3 differs from the power conversion device 2 according to the embodiment 2 with respect to a point that the power conversion device according to the embodiment 3 includes a temperature characteristic calculation part. In the power conversion device according to the embodiment 3, as shown in FIG. 9, each switching element control circuit performs a temperature characteristic measurement mode where a temperature characteristic of a threshold voltage in a switching element 200 is measured after a control mode is performed for a predetermined time.

In this embodiment, for the sake of brevity, only a switching element control circuit 100 of a power module PM1 is described. However, a switching element control circuit 102 of a power module PM2 also has substantially the same configuration, and performs substantially the same operation.

The temperature characteristic calculation part 90 is connected to a temperature detection part 20 and a memory part 40, and calculates a temperature characteristic of a threshold voltage of the switching element.

The following operation is performed in the temperature characteristic measurement mode.

After the control mode is performed for a predetermined time, a current for threshold voltage measurement is supplied from a threshold voltage measurement power source 60 to a drain electrode of the switching element 200 in a state where a current is not supplied from a drive power source 420 (see FIG. 9).

Next, a gate voltage control part 10 controls a gate voltage such that a voltage lower than a scheduled threshold voltage (during operation) which is set at the time of designing the power module is applied to a gate electrode. At this stage of operation, a switching current is not detected by a switching current detection part 70 (a value of the switching current being 0) and hence, an ON/OFF state determination part 80 determines that the switching element 200 is in an OFF state. When the ON/OFF state determination part 80 determines that the switching element 200 is in an OFF state, the gate voltage control part 10 controls the gate voltage such that the gate voltage is increased by one stage (see FIG. 8).

When the gate voltage is increased in stages (specifically being increased in a stepwise manner) by repeating such an operation so that a switching current is detected by the switching current detection part 70 (the switching current taking a value other than 0), the ON/OFF state determination part 80 determines that the switching element 200 is in an ON state. At this stage of operation, an operation temperature $T_M$ of the switching element 200 detected by the temperature detection part 20 is transmitted to the memory part 40, and the memory part 40 stores the operation temperature $T_M$. Further, the gate voltage control part 10 transmits a gate-source voltage Vgs applied to the gate electrode to the memory part 40 as a temperature characteristic measurement time threshold voltage $Vth_M$, and the memory part 40 stores the gate-source voltage Vgs as the temperature characteristic measurement time threshold voltage $Vth_M$.

Next, the temperature characteristic calculation part 90 reads information including an initial threshold voltage $Vth_{O1}$, an initial temperature $T_{O1}$ of the switching element 200 when the initial threshold voltage $Vth_{O1}$ is measured and the temperature characteristic measurement time threshold voltage $Vth_M$, and reads the operation temperature $T_M$ of the switching element 200 detected by the temperature detection part 20 in the temperature characteristic measurement mode from the memory part 40, and calculates a temperature characteristic (to be more specific, a temperature coefficient α) by putting $Vth=Vth_M$ and $T=T_M$ to a characteristic equation of $Vth=Vth_O-\alpha(T-T_O)$ respectively. The calculated temperature coefficient α is stored in the memory part 40.

In the control mode, a threshold voltage calculation part 50 calculates a threshold voltage $Vth_1$ based on the temperature coefficient α calculated in the temperature characteristic measurement mode, the operation temperature T of the switching element 200 detected by the temperature detection part 20, the initial threshold voltage $Vth_O$ stored in the memory part 40, and the initial temperature $T_{O1}$ of the switching element 200 when the initial threshold voltage $Vth_{O1}$ is measured.

In this manner, the power conversion device according to the embodiment 3 differs from the power conversion device 2 according to the embodiment 2 with respect to the point that the power conversion device according to the embodiment 3 further includes the temperature characteristic calculation part. However, in the same manner as the case of the power conversion device 2 according to the embodiment 2, in the power conversion device according to the embodiment 3, the gate voltage control part 10, 12 of each switching element control circuit 100, 102 controls the gate voltage based on information including an operation temperature $T_1$, $T_2$ of the switching element 200, 202 detected by the temperature detection part 20, 22, and a threshold voltage $Vth_1$, $Vth_2$ during operation calculated based on the operation temperature $T_1$, $T_2$. Accordingly, even when the threshold voltage $Vth_1$, $Vth_2$ during the operation changes from an initial threshold voltage $Vth_{O1}$, $Vth_{O2}$ due to a fact that the operation temperature $T_1$, $T_2$ of the switching element 200, 202 during the operation becomes higher than the initial temperature $T_{O1}$, $T_{O2}$ of the switching element 200, 202 when an initial threshold voltage $Vth_{O1}$, $Vth_{O2}$ is measured, it is possible to apply a voltage which slightly exceeds the threshold voltage $Vth_1$, $Vth_2$ during the operation to the gate electrode. As a result, compared to a case where the third electrode voltage is controlled using a designed threshold voltage, a turn-on period and a turn-off period can be shortened and hence, a switching loss of the switching element 200, 202 can be reduced.

Further, in the power conversion device according to the embodiment 3, the gate voltage control part 10, 12 controls the gate voltage based on information including the average operation temperature aveT, an operation temperature $T_1$, $T_2$ of the switching element detected by the temperature detection part 20, 22, and a threshold voltage calculated based on the operation temperature and hence, the gate voltage can be controlled based on a temperature difference between the average operation temperature aveT and an operation temperature $T_1$, $T_2$ of the corresponding switching element. Accordingly, even when irregularities occur in an operation temperature of each switching element 200, 202, irregularities minimally occurs in a balance of currents distributed to each switching element 200, 202. Accordingly, it is possible to prevent rapid deterioration of the switching element of a high temperature. As a result, even when the power conversion device is operated in a state where a plurality of power modules are connected in parallel to each other, the lifetime of the power conversion device can be prolonged.

Further, in the power conversion device according to the embodiment 3, the temperature characteristic calculation part 90 calculates a temperature characteristic of a threshold voltage of the switching element 200 based on information including an initial threshold voltage $Vth_{01}$, an initial temperature $T_0$ of the switching element 200 when the initial threshold voltage $Vth_{01}$ is measured, an operation temperature $T_1$ of the switching element 200 detected by the temperature detection part 20 in the temperature characteristic measurement mode, and a temperature characteristic measurement time threshold voltage $Vth_M$. Accordingly, even when an actual temperature characteristic changes from a designed temperature characteristic due to irregularities in the manufacture of the switching element 200, a threshold voltage during operation of the switching element can be accurately calculated. As a result, it is possible to apply a voltage which slightly exceeds the threshold voltage $Vth_1$ during the operation to the gate electrode with certainty. Accordingly, a turn-on period and a turn-off period can be shortened with certainty and, as a result, a switching loss can be reduced with certainty (substantially the same operation being performed and substantially the same advantageous effects being acquired also in the power module PM2).

The power conversion device according to the embodiment 3 has substantially the same configuration as the power conversion device 2 according to the embodiment 2 with respect to points other than the point that the power conversion device according to the embodiment 3 further includes the temperature characteristic calculation part. Accordingly, the power conversion device according to the embodiment 3 acquires the corresponding advantageous effects found amongst all advantageous effects which the power conversion device 2 according to the embodiment 2 acquires.

Embodiment 4

Figure 10:
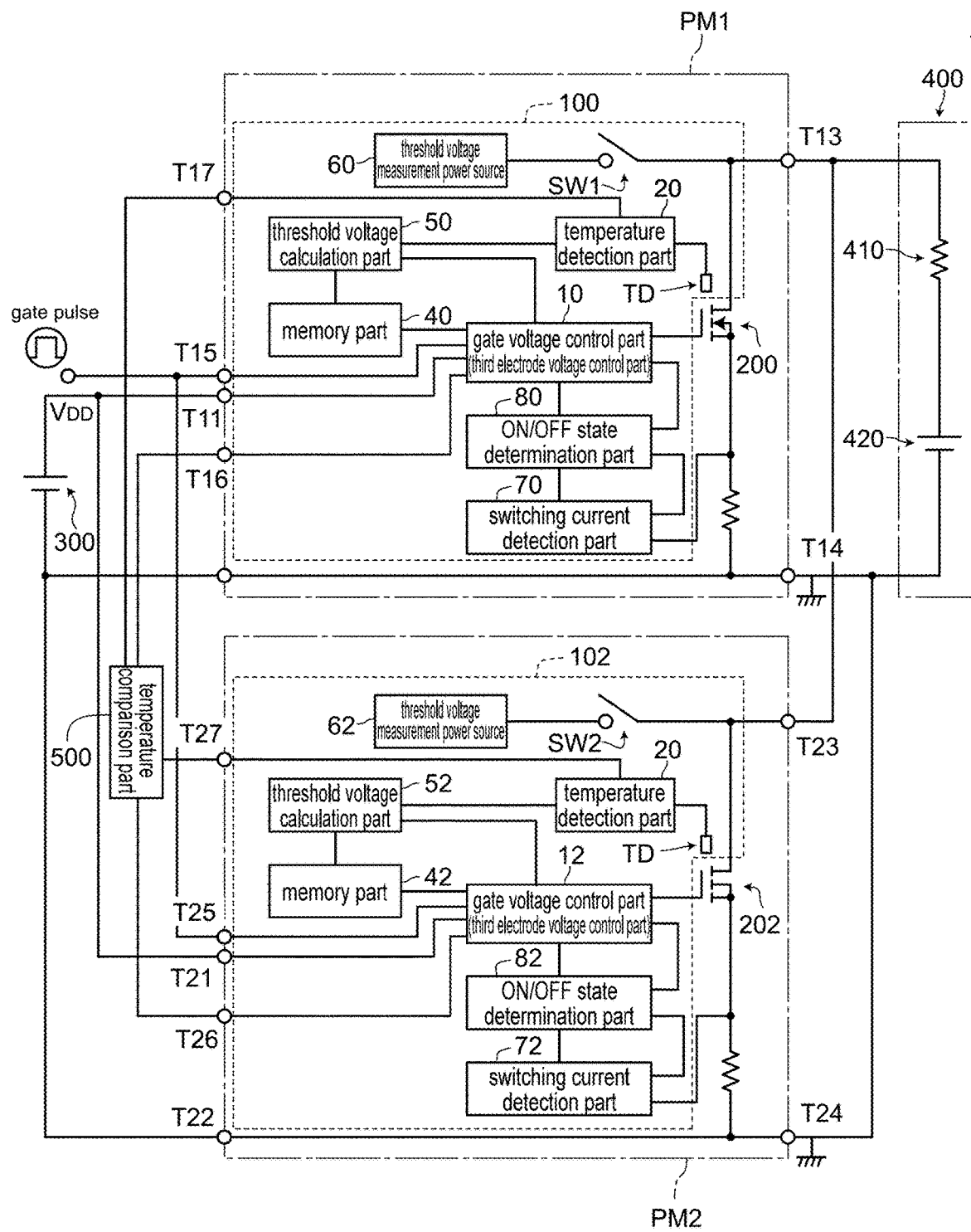
FIG. 10 is a circuit diagram of a power conversion device 3 according to an embodiment 4.

A power conversion device 3 according to an embodiment 4 basically has substantially the same configuration as the power conversion device 1 according to the embodiment 1. However, the power conversion device 3 according to the embodiment 4 differs from the power conversion device 1 according to the embodiment 1 in the configuration of a temperature comparison part. That is, in the power conversion device 3 according to the embodiment 4, a temperature comparison part is not provided to respective power modules (switching element control circuits), and only one temperature comparison part is disposed in the power conversion device (see FIG. 10).

The temperature comparison part 500 receives operation temperatures of switching elements 200, 202 of the respective power modules PM1, PM2, calculates an average operation temperature aveT of all switching elements in the power conversion device, compares the operation temperature of the corresponding switching element 200, 202 with the average operation temperature aveT, and transmits the comparison result to the gate voltage control part 10, 12 of each power module PM1, PM2 respectively.

In this manner, the power conversion device 3 according to the embodiment 4 differs from the power conversion device 1 according to the embodiment 1 in the configuration of the temperature comparison part. However, in the same manner as the case of the power conversion device 1 according to the embodiment 1, in the power conversion device 3 according to the embodiment 4, a gate voltage control part 10, 12 of each switching element control circuit 100, 102 controls the gate voltage based on information including an operation temperature $T_1$, $T_2$ of the switching element 200, 202 detected by a temperature detection part 20, 22, and a threshold voltage $Vth_1$, $Vth_2$ during operation calculated based on the operation temperature $T_1$, $T_2$. Accordingly, even when the threshold voltage $Vth_1$, $Vth_2$ during the operation changes from an initial threshold voltage $Vth_{01}$, $Vth_{02}$ due to a fact that the operation temperature $T_1$, $T_2$ of the switching element 200, 202 during the operation becomes higher than the initial temperature $T_{01}$, $T_{02}$ of the switching element 200, 202 when an initial threshold voltage $Vth_{01}$, $Vth_{02}$ is measured, it is possible to apply a voltage which slightly exceeds the threshold voltage $Vth_1$, $Vth_2$ during the operation to the gate electrode. As a result, compared to a case where the third electrode voltage is controlled using a designed threshold voltage, a turn-on period and a turn-off period can be shortened and hence, a switching loss of the switching element 200, 202 can be reduced.

Further, in the power conversion device 3 according to the embodiment 4, a gate voltage control part 10, 12 controls the gate voltage based on information including the average operation temperature aveT, an operation temperature $T_1$, $T_2$ of the switching element detected by the temperature detection part 20, 22, and a threshold voltage calculated based on the operation temperature and hence, the gate voltage can be controlled based on a temperature difference between the average operation temperature aveT and an operation temperature $T_1$, $T_2$ of the corresponding switching element. Accordingly, even when irregularities occur in an operation temperature of each switching element 200, 202, irregularities minimally occurs in a balance of currents distributed to each switching element 200, 202. Accordingly, it is possible to prevent rapid deterioration of the switching element of a high temperature. As a result, even when the power conversion device is operated in a state where a plurality of power modules are connected in parallel to each other, the lifetime of the power conversion device can be prolonged.

Further, the power conversion device 3 according to the embodiment 4 includes the temperature comparison part which calculates an average operation temperature of all of the switching elements in the power conversion device, and compares an operation temperature of the corresponding switching element with the average operation temperature. Accordingly, an area for installing the power conversion device can be made small compared to a power conversion device which includes a temperature comparison part for each power module and hence, the power conversion device can be miniaturized.

The power conversion device 3 according to the embodiment 4 has substantially the same configuration as the power conversion device 1 according to the embodiment 1 with respect to points other than the configuration of the temperature comparison part. Accordingly, the power conversion device 3 according to the embodiment 4 acquires the corresponding advantageous effects found amongst all advantageous effects which the power conversion device 1 according to the embodiment 1 acquires.

The present invention has been described heretofore based on the above-mentioned embodiments. However, the present invention is not limited to the above-mentioned embodiments. The present invention can be carried out in various modes without departing from the gist of the present invention. For example, the following modifications are also conceivable.

(1) The number and the like of the constitutional elements described in the above-mentioned embodiments are provided only for an exemplifying purpose, and can be changed within a range where advantageous effects of the present invention are not impaired.

(2) In the above-mentioned respective embodiments, the power conversion device includes two sets of power modules. However, the present invention is not limited to such a configuration. The power conversion device may include three or more sets of power modules.

(3) In the above-mentioned respective embodiments, a signal which increases a gate voltage by an increment (decrement) which corresponds to a temperature difference between an operation temperature of the switching element and an average operation temperature is transmitted to the gate voltage control part. However, the present invention is not limited to such a configuration. A signal which increases (decreases) a gate voltage by an increment (decrement) which is decided using a factor other than the increment (decrement) which corresponds to a temperature difference between an operation temperature of the switching element and an average operation temperature may be transmitted to the gate voltage control part.

(4) In the above-mentioned embodiment 3, the power conversion device is provided where each switching element control circuit performs an initial threshold voltage measurement mode, a control mode, and a temperature characteristic measurement mode. However, the present invention is not limited to such a configuration. For example, a power conversion device may be provided where each switching element control circuit performs only an initial control mode and a temperature characteristic measurement mode. In this case, an initial threshold voltage $Vth_{01}$, $Vth_{02}$ and an initial temperature $T_{01}$, $T_{02}$ are stored in the memory part in advance.

(5) In the above-mentioned respective embodiments, information relating to temperature characteristic of a threshold voltage of the switching element is a characteristic equation which satisfies the relationship of $Vth=Vth_0-\alpha(T-T_0)$. However, the present invention is not limited to such a case. For example, the information relating to a temperature characteristic of a threshold voltage in a switching element may be another characteristic equation, or may be data indicating a relationship between a temperature and a threshold voltage stored in a memory part in advance (on a 1 to 1 basis).

Figure 11:
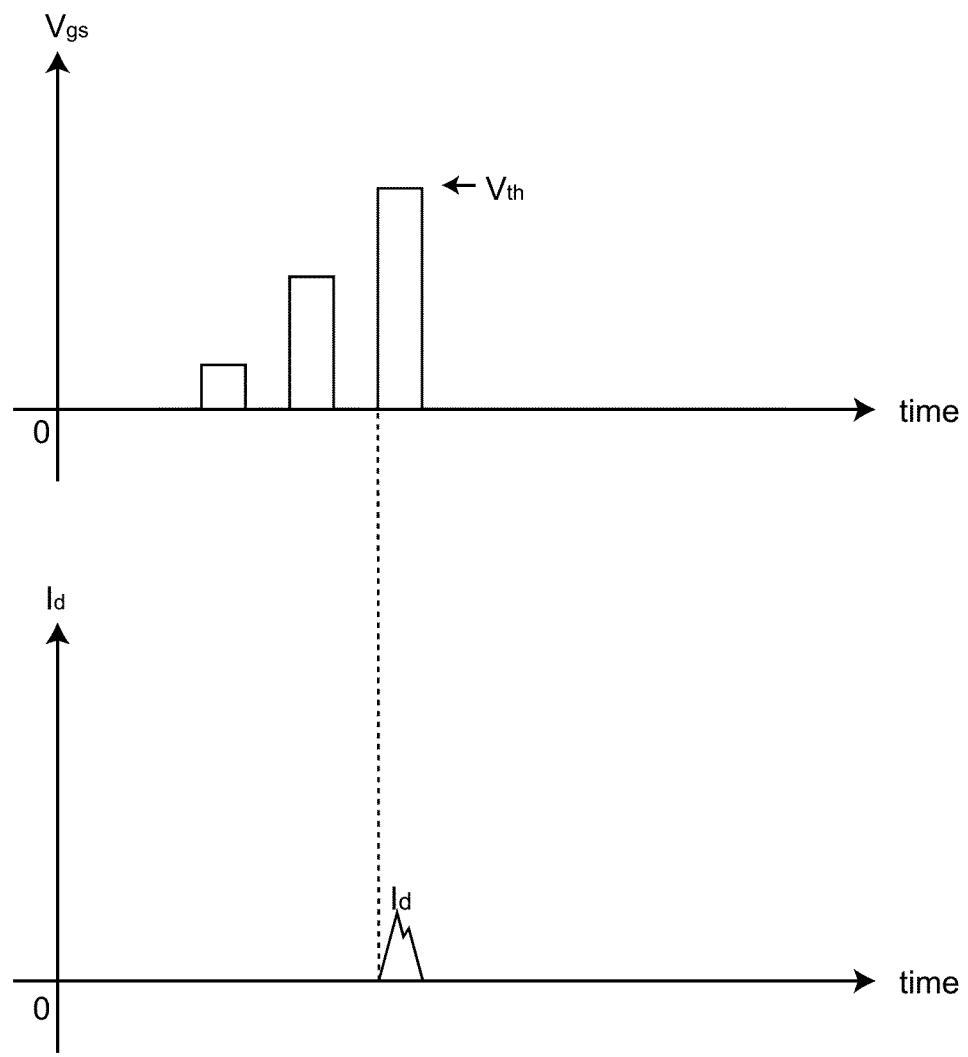
FIG. 11 is a schematic view of a graph describing an initial threshold voltage measurement mode of a power conversion device according to a modification.
Figure 12:
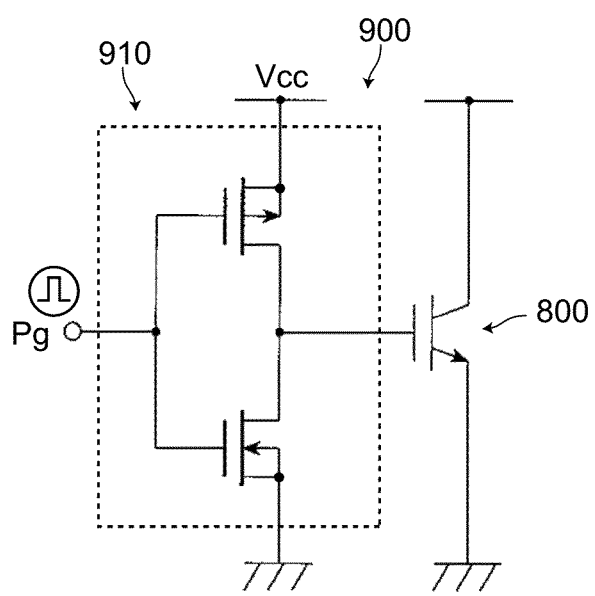
FIG. 12 is a view for describing a conventional power module 900.

(6) In the above-mentioned respective embodiments, in an initial threshold voltage measurement mode, the gate voltage control part controls a gate voltage such that the gate voltage is increased in a stepwise manner with a lapse of time. However, the present invention is not limited to such a case. For example, the gate voltage control part may control a gate voltage such that the gate voltage becomes a pulse-like voltage which is a pulse whose amplitude is increased with a lapse of time (see FIG. 11).

(7) In the above-mentioned respective embodiments, each power module has one switching element. However, the present invention is not limited to such a configuration. The power module may include a plurality of switching elements. In this case, the power module may control the plurality of switching elements.

(8) In the above-mentioned respective embodiments, the switching element is formed using a material which contains GaN. However, the present invention is not limited to such a switching element. The switching element may be formed using a material which contains a wide gap semiconductor such as SiC or $Ga_2O_3$, or a material which contains silicon.

(9) In the above-mentioned embodiments, a MOSFET is used as the switching element. However, the present invention is not limited to such a switching element. A switching element other than a MOSFET (for example, a HEMT, an IGBT or the like) may be used as the switching element.

(10) In the above-mentioned respective embodiments, the control circuit and the power circuit of the power module may be formed as separate semiconductor substrates or the control circuit and the power circuit of the power module may be formed of the same semiconductor substrate. Further, the switching element and the circuit parts other than the switching element may be formed on separate semiconductor substrates or the switching element (for example, the semiconductor element having the lateral structure made of GaN) and the circuit parts other than the switching element may be formed on the same semiconductor substrate.

The invention claimed is:

1. A power conversion device comprising two or more sets of power modules each of which includes: a switching element having a first electrode, a second electrode, and a third electrode; a third electrode voltage control part which controls a third electrode voltage for controlling an ON/OFF operation of the switching element; and a switching element control circuit which has a temperature detection part detecting an operation temperature of the switching element, wherein the power modules are connected in parallel to each other, each of the switching element control circuits further includes a temperature comparison part which calculates an average operation temperature of all of the switching elements in the power conversion device, and compares an operation temperature of the corresponding switching element with the average operation temperature, the third electrode voltage control part controls the third electrode voltage based on information including the average operation temperature, an operation temperature of the switching element detected by the temperature detection part, and a threshold voltage during operation calculated based on the operation temperature, and the temperature comparison part transmits a signal which increases the third electrode voltage to the third electrode voltage control part when an operation temperature of the switching element is lower than the average operation temperature, and transmits a signal which decreases the third electrode voltage to the third electrode voltage control part when the operation temperature of the switching element is higher than the average operation temperature.

2. The power conversion device according to claim 1, wherein the temperature detection part comprises a thermistor as a temperature detection element.

3. The power conversion device according to claim 1, wherein the switching element is a MOSFET, an IGBT, or a HEMT.

4. The power conversion device according to claim 1, wherein the switching element is formed using a material which contains GaN, SiC, or $Ga_2O_3$.

5. A power conversion device comprising two or more sets of power modules each of which includes: a switching element having a first electrode, a second electrode, and a third electrode; a third electrode voltage control part which controls a third electrode voltage for controlling an ON/OFF operation of the switching element; and a switching element control circuit which has a temperature detection part detecting an operation temperature of the switching element, wherein the power modules are connected in parallel to each other,
each of the switching element control circuits further includes a temperature comparison part which calculates an average operation temperature of all of the switching elements in the power conversion device, and compares an operation temperature of the corresponding switching element with the average operation temperature,
the third electrode voltage control part controls the third electrode voltage based on information including the average operation temperature, an operation temperature of the switching element detected by the temperature detection part, and a threshold voltage during operation calculated based on the operation temperature, and
the temperature comparison part transmits a signal which increases the third electrode voltage to the third electrode voltage control part by an increment which corresponds to a temperature difference between an operation temperature of the switching element and the average operation temperature when the operation temperature of the switching element is lower than the average operation temperature, and transmits a signal which decreases the third electrode voltage to the third electrode voltage control part by a decrement corresponding to a temperature difference between an operation temperature of the switching element and the average operation temperature when the operation temperature of the switching element is higher than the average operation temperature.

6. The power conversion device according to claim 5, wherein the temperature detection part comprises a thermistor as a temperature detection element.

7. The power conversion device according to claim 5, wherein the switching element is a MOSFET, an IGBT, or a HEMT.

8. The power conversion device according to claim 5, wherein the switching element is formed using a material which contains GaN, SiC, or $Ga_2O_3$.

9. A power conversion device comprising two or more sets of power modules each of which includes: a switching element having a first electrode, a second electrode, and a third electrode; a third electrode voltage control part which controls a third electrode voltage for controlling an ON/OFF operation of the switching element; and a switching element control circuit which has a temperature detection part detecting an operation temperature of the switching element, wherein the power modules are connected in parallel to each other,
each of the switching element control circuits further includes a temperature comparison part which calculates an average operation temperature of all of the switching elements in the power conversion device, and compares an operation temperature of the corresponding switching element with the average operation temperature,
the third electrode voltage control part controls the third electrode voltage based on information including the average operation temperature, an operation temperature of the switching element detected by the temperature detection part, and a threshold voltage during operation calculated based on the operation temperature, and
each of the switching element control circuits includes:
a memory part which stores information including an initial threshold voltage of the switching element and an initial temperature of the switching element when the initial threshold voltage is measured and information relating to a temperature characteristic of a threshold voltage of the switching element; and
a threshold voltage calculation part which calculates a threshold voltage during operation of the switching element based on information including the operation temperature of the switching element which is detected by the temperature detection part, an initial threshold voltage of the switching element, and an initial temperature of the switching element when the initial threshold voltage is measured, and information relating to a temperature characteristic of a threshold voltage of the switching element, wherein
the third electrode voltage control part controls the third electrode voltage based on information including the threshold voltage during the operation which is calculated by the threshold voltage calculation part as the threshold voltage during the operation calculated based on the operation temperature.

10. The power conversion device according to claim 9, wherein assuming a temperature coefficient of a threshold voltage of the switching element as $\alpha$, a threshold voltage during the operation of the switching element as Vth, the initial threshold voltage as $Vth_0$, the operation temperature of the switching element detected by the temperature detection part as T, and an initial temperature of the switching element when the initial threshold voltage is measured as $T_0$, information relating to the temperature characteristic of the threshold voltage of the switching element is a characteristic equation which satisfies the relationship of $Vth=Vth_0-\alpha(T-T_0)$.

11. The power conversion device according to claim 9, wherein each of the switching element control circuits is a switching element control circuit which performs an initial threshold voltage measurement mode where the initial threshold voltage of the corresponding switching element is measured, and a control mode where an ON/OFF operation of the corresponding switching element is controlled, each of the switching element control circuits further includes:
a threshold voltage measurement power source which supplies a threshold voltage measurement current to the first electrode of the switching element;
a first electrode current detection part which detects a first electrode current flowing through the switching element; and
an ON/OFF state determination part which determines an ON/OFF state of the switching element, and
in the initial threshold voltage measurement mode,
the third electrode voltage control part controls the third electrode voltage such that the third electrode voltage is increased in a stepwise manner, the ON/OFF state determination part determines whether or not the switching element is turned on base on the first electrode current which is detected by the first electrode current detection part, and the memory part, when the ON/OFF state determination part determines that the switching element is brought into an ON state, stores the temperature of the switching element, and stores the third electrode voltage applied to the third electrode as the initial threshold voltage of the switching element.

12. The power conversion device according to claim 11, wherein each of the switching element control circuits is a switching element control circuit which further performs a temperature characteristic measurement mode where a temperature characteristic of a threshold voltage of the switching element is measured after the control mode is performed for a predetermined time, each of the switching element control circuits further includes a temperature characteristic calculation part which calculates a temperature characteristic of a threshold voltage of the switching element, and in the temperature characteristic measurement mode, the third electrode voltage control part controls the third electrode voltage such that the third electrode voltage is increased in a stepwise manner, the ON/OFF state determination part determines whether or not the switching element is turned on based on the switching current which is detected by the switching current detection part, the memory part, when the ON/OFF state determination part determines that the switching element is brought into an ON state, stores the operation temperature of the switching element, and stores the third electrode voltage applied to the third electrode as a temperature characteristic measurement time threshold voltage of the switching element, and the temperature characteristic calculation part calculates a temperature characteristic of a threshold voltage of the switching element based on information including the initial threshold voltage, an initial temperature of the switching element when the initial threshold voltage is measured, the operation temperature of the switching element detected by the temperature detection part in the temperature characteristic measurement mode, and the temperature characteristic measurement time threshold voltage.

13. The power conversion device according to claim 9, wherein each of the switching element control circuits is a switching element control circuit which performs a temperature characteristic measurement mode where a temperature characteristic of a threshold voltage in the corresponding switching element is measured after the control mode is performed for a predetermined time, each of the respective switching element control circuits further includes:

a threshold voltage measurement power source which supplies a threshold voltage measurement current to the first electrode of the switching element;

a switching current detection part which detects a switching current flowing through the switching element;

an ON/OFF state determination part which determines an ON/OFF state of the switching element; and a temperature characteristic calculation part which calculates a temperature characteristic of a threshold voltage of the switching element, and in the temperature characteristic measurement mode, the third electrode voltage control part controls the third electrode voltage such that the third electrode voltage is increased in a stepwise manner, the ON/OFF state determination part determines whether or not the switching element is turned on based on the switching current which is detected by the switching current detection part, the memory part, when the ON/OFF state determination part determines that the switching element is brought into an ON state, stores the third electrode voltage applied to the third electrode as a temperature characteristic measurement time threshold voltage of the switching element, and the temperature characteristic calculation part calculates a temperature characteristic of a threshold voltage of the switching element based on information including the initial threshold voltage, an initial temperature of the switching element when the initial threshold voltage is measured, the operation temperature of the switching element detected by the temperature detection part in the temperature characteristic measurement mode, and the temperature characteristic measurement time threshold voltage.

14. The power conversion device according to claim 9, wherein the switching element is a MOSFET, an IGBT, or a HEMT.

15. The power conversion device according to claim 9, wherein the switching element is formed using a material which contains GaN, SiC, or $Ga_2O_3$.

* * * * *